United States Patent
Monaco et al.

(10) Patent No.: US 6,402,224 B1
(45) Date of Patent: Jun. 11, 2002

(54) CONTROL MECHANISM FOR COVERS TO LARGE CONTAINERS

(75) Inventors: Timothy A. Monaco, Galion; Christoph L. Gillum, Springboro; Timothy L. Duell, Crestline, all of OH (US)

(73) Assignee: Galion Solid Waste Equipment Company Inc., Galion, OH (US)

( * ) Notice: Subject to any disclaimer, the term of this patent is extended or adjusted under 35 U.S.C. 154(b) by 0 days.

(21) Appl. No.: 09/643,044

(22) Filed: Aug. 21, 2000

(51) Int. Cl.[7] .................................................. B60P 7/02
(52) U.S. Cl. ................................ 296/100.1; 296/100.06
(58) Field of Search ........................ 296/100.01, 100.02, 296/100.06, 100.08, 100.1, 101, 147, 184; 49/258, 260, 291, 339, 345, 346

(56) References Cited

U.S. PATENT DOCUMENTS

| | | | | |
|---|---|---|---|---|
| 1,451,127 | A | * 4/1923 | Thornton | 414/343 |
| 2,408,132 | A | * 9/1946 | Weeks | 296/223 |
| 3,326,595 | A | 6/1967 | Ogilvie | 296/37 |
| 4,627,658 | A | * 12/1986 | Vold et al. | 296/100.1 |
| 4,746,257 | A | 5/1988 | Barry | 414/392 |
| 4,767,152 | A | * 8/1988 | Stluka et al. | 296/100.1 |
| 4,954,039 | A | * 9/1990 | Johnston et al. | 414/500 |
| 5,143,496 | A | 9/1992 | Smith et al. | 410/68 |
| 5,388,849 | A | 2/1995 | Arsenault et al. | 280/425.1 |
| 5,765,986 | A | 6/1998 | Hulls | 414/786 |
| 6,041,548 | A | * 3/2000 | Miller | 49/345 |
| 6,120,080 | A | * 8/2000 | Hori et al. | 296/56 |

OTHER PUBLICATIONS

Side Winder, taken from Enterprises Donovan Raise the Standard.
Schneider, R.T., Construction equipment: tough, easy to operate, and safe, taken from *Hydraulics & Pneumatics*, of Apr. 2000.
Standard Features Package, Impac.
Integrated Side Loader (ISL).
Wittke Waste Products, The Sprinter.
The Rand Challenger II.
The New Rand Champion.
Loadmaster, EnviroMaster.
Various ads for: Hydraulic Flip Tops for trailer beds, taken from The Hauler of Jun. 1999.
Sidewinder transfer trailer tarping system.
McClaim EZ Pak, prior door control system for transfer trailers (2 pages).

* cited by examiner

*Primary Examiner*—Joseph D. Pape
*Assistant Examiner*—Jason Morrow
(74) *Attorney, Agent, or Firm*—Niro, Scavone Haller & Niro

(57) ABSTRACT

A control linkage system for opening and closing a door at least partially covering an opening to a large container such as a transfer trailer. The linkage system maintains constant control over the door during rotation, using mechanical linkage providing increased rotational motion and enhanced mechanical advantage. The linkage system employs hydraulic cylinders pivotally attached to the side wall of the container. The linkage system alse employs a curved link joined to a straight link in the same plane as the mechanical linkage.

18 Claims, 3 Drawing Sheets

CONTROL MECHANISM FOR COVERS TO LARGE CONTAINERS

BACKGROUND OF THE INVENTION

The invention generally relates to covers over the openings of large containers, such as transfer trailers. More specifically, the invention relates to a control mechanism for opening and closing such covers.

Many different types of large containers are used for hauling loads and waste, such as solid waste, construction debris, landscape materials, recyclables, etc. One such type are wheeled containers designed for hauling by trucks, known as "transfer trailers". Transfer trailers are typically rectangular-shaped with open tops. Covers over the open tops are typically provided to prevent the load from spilling, sliding or being blown out the top of the container during transport. These covers have taken various forms in the past, including tarpaulin, lightweight nylon doors, open mesh plastic screens, etc. Some past trailer cover doors have consisted of two half-doors each rotating about a pivot point located adjacent each sidewall of the trailer. However, the doors may be 45 feet in length, and may each weigh 400 pounds, for example. Thus, the doors may be too heavy to manually open and close, and for this purpose hydraulic power mechanisms have been employed.

Known rotation control mechanisms for flip tops have disadvantages. They do not maintain control of the cover door(s) during their entire rotation. Thus, once a door has been rotated over-center, conventional powering mechanisms allow it to free fall down and possibly be damaged upon impact with the outer sidewall of the container. In the case of hazardous waste, for example, the doors need to be tightly sealed, such as by using a rubber gasket seal, and this may be impossible if the doors are sufficiently damaged, such as being bent. Further, such powering mechanisms have been relatively expensive since they have required relatively large hydraulic pressures to accomplish door rotation.

Accordingly, it is an object of the present invention to provide a control mechanism for a trailer cover which maintains control of the cover doors during their entire rotation, preventing damage to the doors and/or the trailer.

It is another object of the invention to provide a control mechanism for covering a container opening which requires relatively low hydraulic or air pressure as compared to conventional control mechanism, enabling the more economic manufacture and use of the trailer.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

Container: Any large receptable, including but not limited to a transfer trailer, such as containers used for holding and/or hauling loads or waste.

Linkage mechanism: A system of links or bars which are joined together.

SUMMARY OF THE INVENTION

The objects mentioned above, as well as other objects, are solved by the present invention, and overcome disadvantages of prior art mechanisms for controlling the opening and closing of large container covers, such as transfer trailer doors, while providing new advantages not believed associated with such mechanisms.

In one preferred embodiment, a device is provided for controlling the opening and closing of at least one door covering at least part of an opening of a container, such as a transfer trailer or other container. The door(s) may be pivotally or otherwise attached to various locations on the container such as at an upper edge of the container, for example. The device includes one or more power mechanisms attached to the container for driving rotation of the door. The power mechanism may include a hydraulic cylinder or an air-powered cylinder, for example. At least one linkage mechanism is connected to the power mechanism, and transfers force from the power mechanism to open or close the door, such as by driving its rotation. Preferably, the door(s) remains under constant control, such as under constant rotational control, of the power mechanism during its opening and closing. Preferably, the door rotates through at least about 180° and, more preferably, rotates through at least about 270°.

In a preferred embodiment, at least one arm is provided which is slidably and pivotally connected to the at least one door and also pivotally connected to the container, and the linkage mechanism substantially increases the rotational mechanical advantage imparted by the power mechanism to the at least one arm. In a preferred embodiment, the linkage mechanism may include first and second links. The first link may be pivotally connected to the power mechanism and to a wall of the container, and the second link may be pivotally connected to the first link and to the arm. In one embodiment, one link may be curved and the other may be straight, allowing the use of links in the same or substantially the same plane. The curved link may be pivotally attached to the container, and the straight link may be pivotally attached to an intermediate portion of the arm and also pivotally attached to the curved link. In an alternative embodiment, two straight links may be used, in which case they may be designed to be in different or substantially different planes. In a particularly preferred embodiment, a first four-bar linkage connected to the power mechanism drives a second four-bar linkage connected to the door.

In a particularly preferred embodiment, the ratio of cylinder pressure (psi) to door weight (pounds), or the "cylinder pressure-to-door weight ratio" is preferably less than about 3.0, and more preferably less than about 2.0. Also with the present invention the ratio of cylinder force to door weight, or the "cylinder force-to-door weight ratio" is about 22, and in preferably in the range of about less than 30, and more preferably less than about 25. In a preferred embodiment, a power mechanism employs at least one hydraulic cylinder under pressure of less than about 2000 psi, and more preferably less than about 1000 psi.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENTS

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Figure 1:
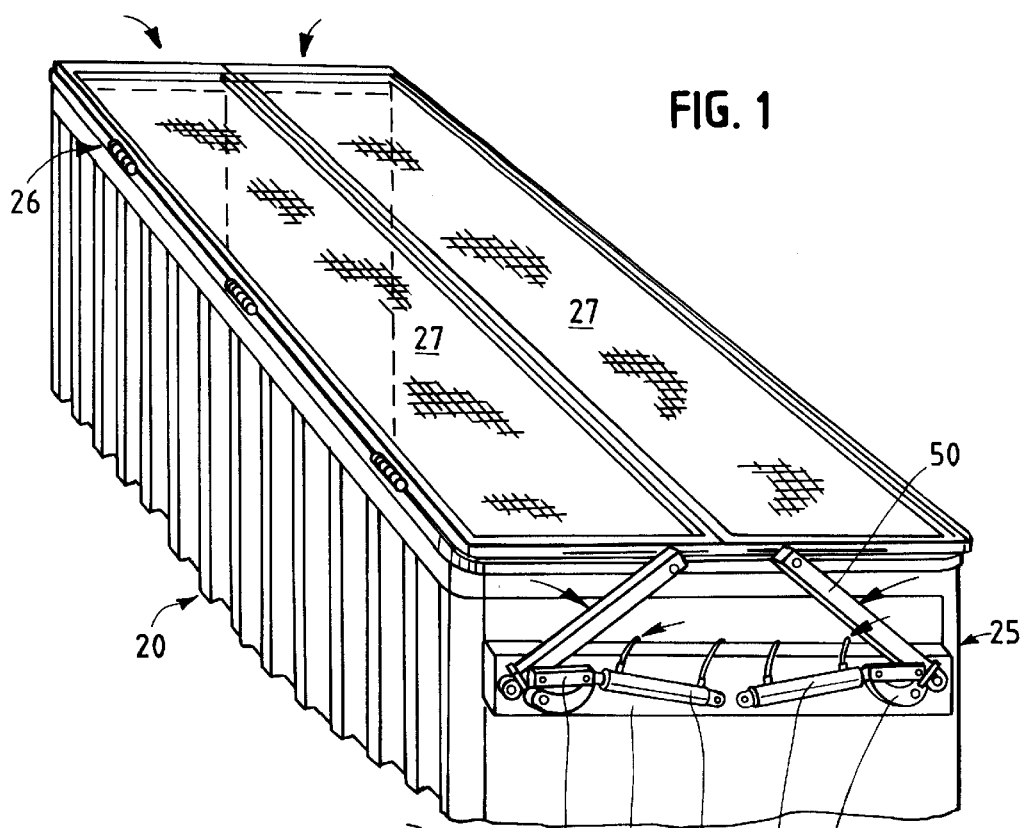
FIGS. 1 and 2 are partial perspective views of the upper portion of a trailer equipped with a preferred embodiment of the trailer cover control mechanism of the present invention.
Figure 2:
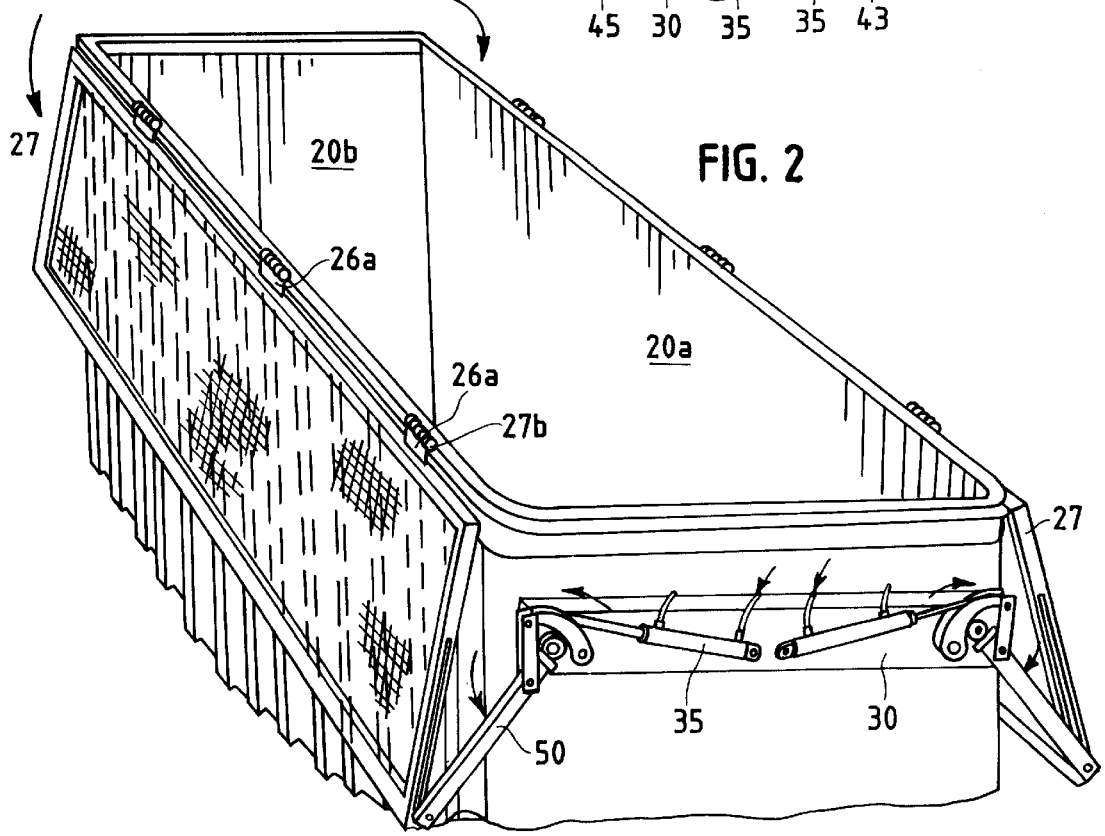
Figure 3:
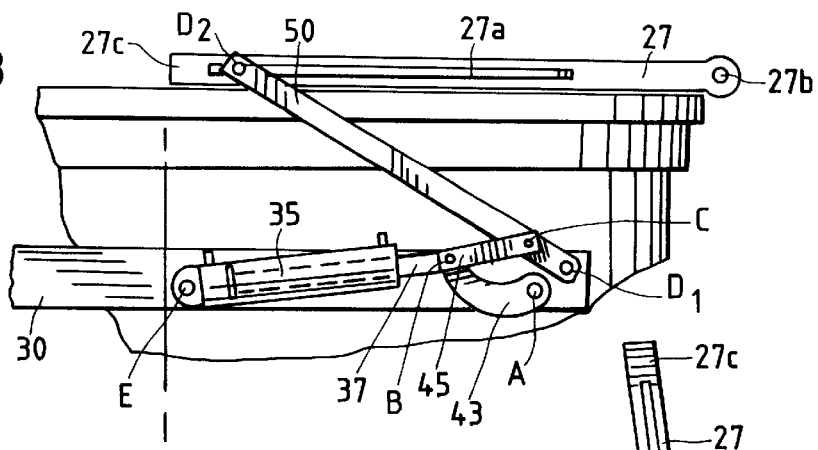
FIGS. 3–5 are partial, enlarged views showing sequential movement of the right-side control mechanism shown in FIGS. 1 and 2.
Figure 4:
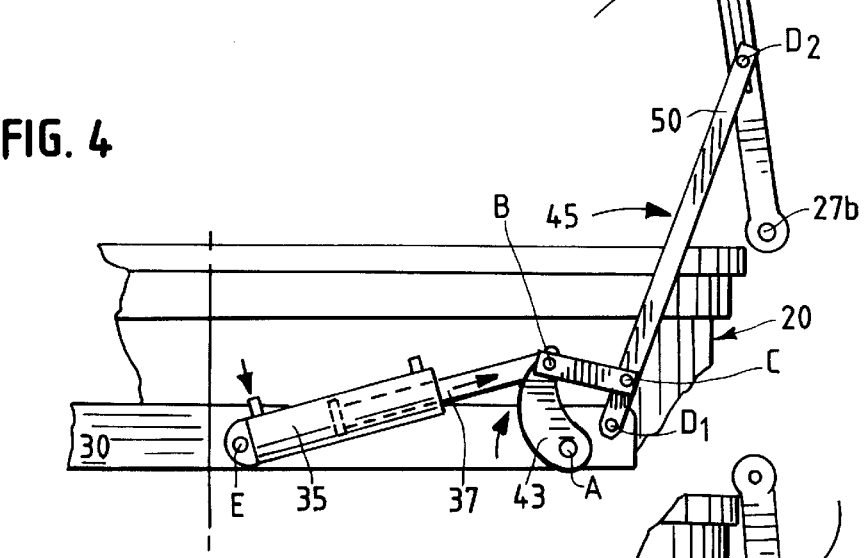
Figure 5:
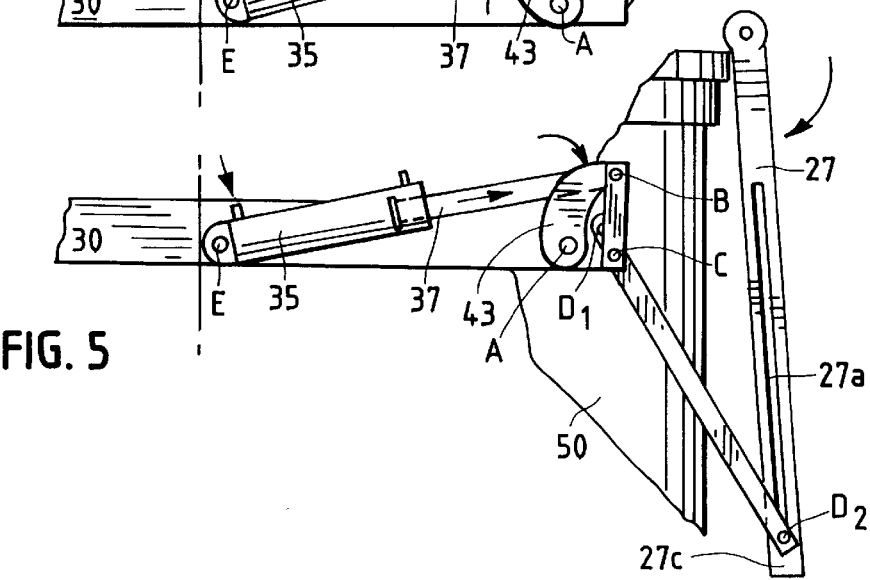
Figure 6:
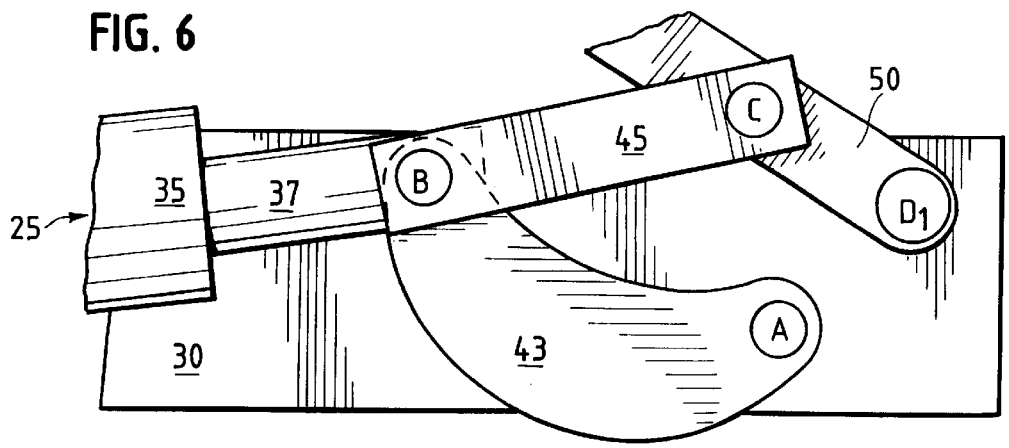
FIGS. 6–8 are partial, enlarged views showing sequential movement of the linking mechanisms which form a portion of the right-side control mechanism shown in FIGS. 3–5.
Figure 7:
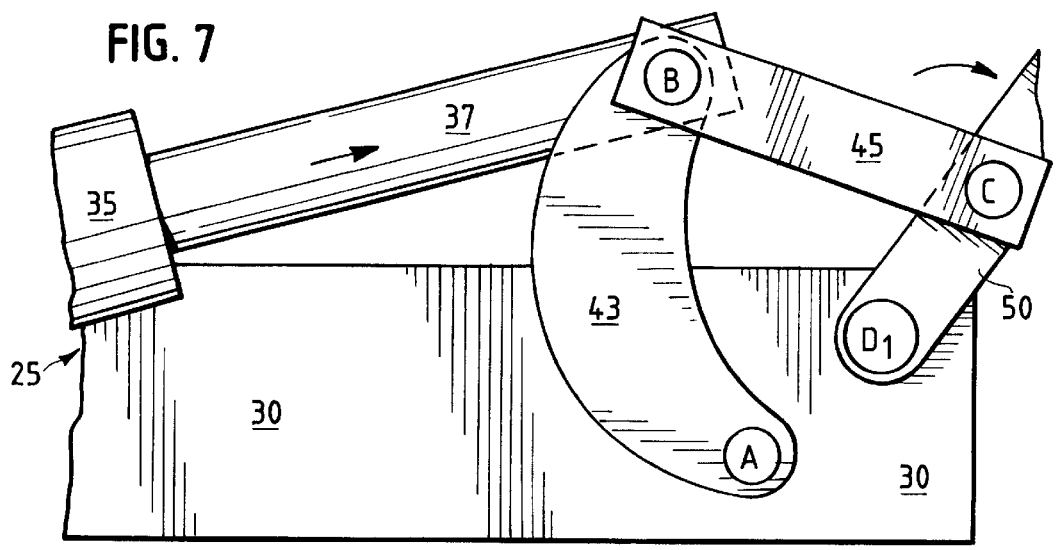
Figure 8:
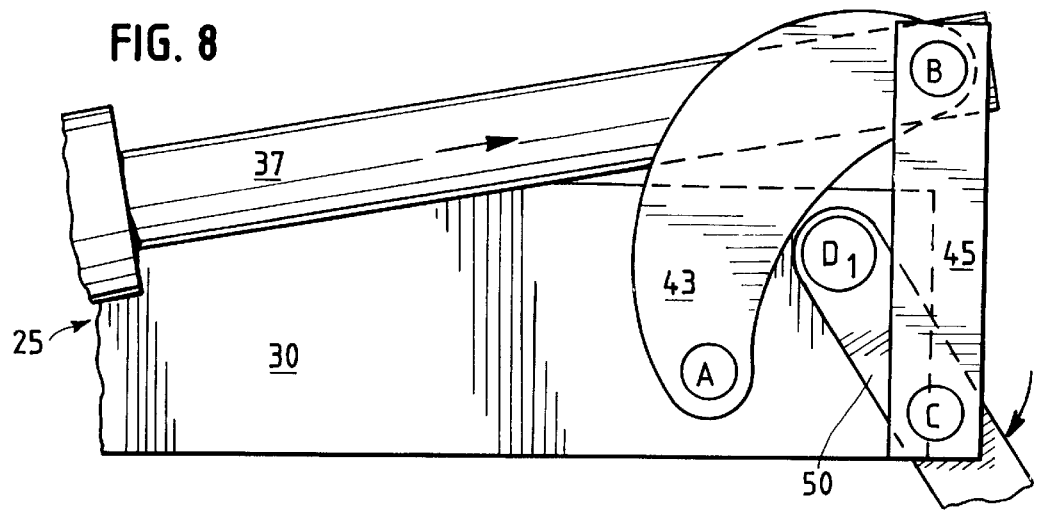

Referring first to FIGS. 1–2, a container, designated generally as 20, is shown. Container 20 may be a transfer trailer, or other large container, having sidewalls 20a and end walls 20b. Doors 27 are pivotally attached at upper end 26 via pivotable brackets 26a or other means. Instead of two doors, as shown, a single cover or door may be used. Container 20 may be unloaded, for example, by opening a door forming end wall 20b opposite the end wall carrying the control mechanism, designated generally as 25, for the door(s).

Referring now to FIGS. 1–5, a preferred embodiment of control mechanism 25 is shown. Control mechanism 25 controls rotation of flip top doors 27 about pivot point(s) 27b on the upper end 26 of transfer trailer 20. A rubber gasket or seal strip (not shown) may cover upper ends 26 to provide a tight seal between doors 27 to upper end 26 of the trailer. Control mechanism 25 may possibly be directly attached to a sidewall or end wall of container 20. Alternatively, a rigid support bar, such as support bar 30, may carry control mechanism 25 and be rigidly attached to a container wall as shown in the drawings. A power mechanism, such as one or more hydraulic cylinders 35, may be rigidly attached to support bar 30.

In one particularly preferred embodiment, shown in FIGS. 3–8, curved link 43 is attached at one end to an end of support bar 30 at pivot point "A", and is attached at a second end to link 45 at pivot point "B". Link 45, which may be curved and need not be straight, as shown, is pivotally attached at "C" to arm 50, which is pivotally attached at "$D_1$" to support 30. Arm 50 is pivotally and slidably attached at point "$D_2$", such that arm 50 slides within passage 27a of door 27. The ends of cylinder rods 37 are also each pivotally attached to straight link 45 at pivot point B. The other end of straight link 45 is pivotally attached to an intermediate point on arm 50 at pivot point "C". Cylinders 35 are each free to pivot about fixed pin E.

In operation, and referring now to the sequence of FIGS. 3–5 and 6–8 showing the portion of control mechanism 25 associated with the right-hand side door, rotation of doors 27 is accomplished as follows. When cylinder rod 37 is extended, curved link 43 is rotated clockwise, as indicated by the arrow in FIG. 4, about point A. This exerts a force on straight link 45, causing right-hand side door 27 to be rotated clockwise about point 27b; as this rotation occurs, end $D_2$ of arm 50 slides along passage 27a first in a direction toward point 27b and then, as door 27 traverses over-center, in a direction away from point 27b and toward the distal end 27c of door 27. Rotation of the left-hand side door is simultaneously accomplished in a similar manner.

Cylinders 35 are free to pivot about pin E, and no external limits such as stops or other means limit the rotation of the cylinders, other than the door itself when it is in an open or closed position. This rotation of cylinders 35 about pin E allows the cylinders to maintain a direct pushing arrangement and limits sideloads which would otherwise be exerted on these cylinders, and which might have a deleterious impact on the packing material (bearings, rings) within the cylinder, potentially allowing the cylinders to leak.

It can be seen that in this preferred embodiment one four-bar linkage (consisting of links 43, 45 and arm 50) drives a second four-bar linkage (consisting of arm 50, slide opening 27a and door 27).

This preferred embodiment shown in the drawings and described above has been found to provide the beneficial result that, for hydraulic cylinders with a bore size of 4 inches, a relatively small cylinder pressure, e.g., about 700 psi (preferably less than about 2000 psi and more preferably less than about 1000 psi), imparting a relatively small cylinder force, e.g., about 8800 pounds of force, is sufficient to rotate open and closed a door that weighs about 400 pounds, for example, through 270°. (This is in contrast to applicant's own prior art system, for example, which requires two to three times this cylinder pressure (about 2400 psi) and cylinder force (about 25,000–27,000 pounds), using the same size cylinder and the same door weight, to rotate open or closed the door.) In a preferred embodiment of the invention, for example, the ratio of cylinder pressure (psi) to door weight (pounds) ("X") is about 1.75, and is preferably in the range of about less than 3.0, and more preferably less than about 2.0. With the present invention the ratio of cylinder force to door weight ("Y") is about 22, and in preferably in the range of about less than 30, and more preferably less than about 25. In contrast, these ratios X and Y are about 6 and 60, respectively, for Applicants' own prior art system. The lowered ratios realized by preferred embodiments of the present invention represent increased mechanical advantages provided by improved linkage mechanisms disclosed here.

Another advantage of the present invention is that constant rotational control is maintained over the door, so that the door is not permitted to rotate freely under the forces of gravity and/or to impact or otherwise damage either the container walls or the door itself. Further, the forces within the mechanical linkage and at the pivot points are minimized, extending the life of the control mechanism and the doors. For example, a relatively low lifting and rotating moment around pin 27b is exerted on door 27 by control mechanism 25.

Various alternative embodiments within the spirit and scope of the invention are possible. For example, air cylinders or a hydraulic motor may be used instead of hydraulic cylinders. Also, one cover or door may be used instead of two. The power mechanism may also be configured such that if two or more doors are used, the doors may be rotated separately or at different times. Hydraulic controls (not shown) may be attached to a sidewall of the container. It will also be appreciated that rather than using cylinders, movement of a suitable linkage mechanism (e.g., links 43, 45 and arm 50) may be accomplished using a hydraulic/torque motor, a rack and pinion mechanism, a chain link, or other suitable power or drive mechanisms.

While in the particularly preferred embodiment the use of a curved link 43 and a straight link 45 is disclosed, this is not a requirement. Instead, for example, each link could be straight. Use of a curved link enables this link to curve around and not interfere during its movement with pivot pin D1, and thus allows links 43, 45 to be provided in the same, or substantially the same, plane. If two straight links are provided, each link may preferably be located in different planes to avoid the links from contacting each other during their rotation. Of course, it will be understood that links 43, 45 may be provided with varying shapes and configurations.

In yet another alternative embodiment, which is a modification of the preferred embodiment shown in FIGS. 3–8, bar 50 may be removed, and link 45 may be attached directly to door 27; for this purpose, link 45 may be lengthened, or control mechanism 25 may be located at a higher elevation on the container wall.

In still another alternative embodiment, arm 50 need not be slidably attached to lid or door 27. Instead, a third link could be used, rotatably pinned to an end of arm 50 and also rotatably pinned to door 27 at a point approximately where opening 27*a* terminates toward the distal end 27*c* of the door. This arrangement would still allow door 27 to rotate through about 270°, without the requirement that door 27 be slidably attached to arm 50.

In yet another alternative embodiment, the cylinder rod end and the two links 43, 45 need not meet at common pivot pin B, but instead could be commonly attached through one or more brackets or further links, for example.

The above description is not intended to limit the meaning of the words used in the following claims that define the invention. For example, it will be understood that other control mechanisms specifically mentioned here that accomplish the same general operations may do so in substantially different ways, while still providing a mechanism for controlling container door movement that operates within the principles of the present invention. Rather, it is contemplated that future modifications in structure, function or result will exist that are not substantial changes and that all such insubstantial changes in what is claimed are intended to be covered by the claims.

What is claimed is:

1. A device for controlling the opening and closing of at least one door covering at least part of an opening of a container, comprising:
   one or more power mechanisms attached to the container for providing a force;
   a linkage mechanism connected to the one or more power mechanisms, the linkage mechanism comprising a first four-bar linkage connected to the one or more power mechanisms which drives a second four-bar linkage connected to the at least one door, wherein the one or more power mechanisms, in connection with the linkage mechanism, provide a force sufficient to rotate the at least one door into either a closed or an open position;
   wherein the at least one door remains under constant control of the one or more power mechanisms during opening and closing of the door.

2. The control device of claim 1, wherein the at least one door rotates through at least about 270°.

3. The control device of claim 1, wherein the linkage mechanism increases the rotational mechanical advantage imparted by the one or more power mechanisms to the at least one door.

4. The control device of claim 1, wherein the container is a transfer trailer.

5. A device for controlling the opening and closing of at least one door covering at least part of an opening of a container, comprising:
   at least one arm slidably and pivotally connected to the at least one door and also pivotally connected to the container;
   one or more power mechanisms, each of the one or more power mechanisms comprising hydraulic cylinders attached to the container, the one or more power mechanisms driving rotation of the at least one arm to open and close the at least one door; and
   a linkage mechanism transferring a force from the power mechanism to the at least one arm and increasing the mechanical advantage imparted by the power mechanism to the at least one arm such that the cylinder pressure-to-door weight ratio is less than about 3.0, and the cylinder force-to-door weight ratio is less than about 30;
   wherein the at least one door remains under constant rotational control of the power mechanism during the entire rotational movement of the arm and opening and closing of the door.

6. The control device of claim 5 wherein the at least one door remains under constant rotational control of the power mechanism through a door rotation of at least about 270°.

7. The control device of claim 5, wherein the linkage mechanism comprises first and second links, the first link being pivotally connected to the hydraulic cylinder and to a wall of the container, and the second link being pivotally connected to the first link and to the arm.

8. The control device of claim 7, wherein the first link is curved.

9. The control device of claim 7, wherein the second link is straight.

10. The control device of claim 7, wherein the first link is curved and is pivotally attached to the container, and the second link is straight and is pivotally attached to an intermediate portion of the door, the second link also being pivotally attached to the curved link.

11. The control device of claim 7, wherein the first link is curved and the second link is straight, and wherein each of the links lies in substantially the same plane.

12. The control device of claim 7, wherein each of the first and second links lie in substantially different planes.

13. The control device of claim 5, where the container includes two doors covering an upper opening, the control device comprises two arms, and rotation of each of the arms is driven by an associated different power mechanism.

14. The control device of claim 13, wherein each of the doors is pivotally attached at an upper edge of the container.

15. The control device of claim 5, wherein the cylinder pressure-to-door weight ratio is less than about 2.0.

16. The control device of claim 5, wherein the cylinder force-to-door weight ratio is less than about 25.

17. The control device of claim 5, wherein the hydraulic cylinder is at less than about 2000 psi of pressure.

18. The control device of claim 5, wherein the hydraulic cylinder is at less than about 1000 psi of pressure.

* * * * *